United States Patent
Xie et al.

(10) Patent No.: US 12,225,180 B2
(45) Date of Patent: Feb. 11, 2025

(54) METHOD AND APPARATUS FOR GENERATING STEREOSCOPIC DISPLAY CONTENTS

(71) Applicant: Orbbec 3D Technology International, Inc., Troy, MI (US)

(72) Inventors: Xin Xie, Troy, MI (US); Nan Xu, Troy, MI (US); Xu Chen, Troy, MI (US)

(73) Assignee: Orbbec 3D Technology International, Inc., Troy, MI (US)

( * ) Notice: Subject to any disclaimer, the term of this patent is extended or adjusted under 35 U.S.C. 154(b) by 2 days.

(21) Appl. No.: 17/973,086

(22) Filed: Oct. 25, 2022

(65) Prior Publication Data

US 2024/0137481 A1 Apr. 25, 2024
US 2024/0236288 A9 Jul. 11, 2024

(51) Int. Cl.
*H04N 13/332* (2018.01)
*H04N 13/128* (2018.01)
*H04N 13/207* (2018.01)

(52) U.S. Cl.
CPC ......... *H04N 13/332* (2018.05); *H04N 13/128* (2018.05); *H04N 13/207* (2018.05)

(58) Field of Classification Search
CPC ... H04N 13/332; H04N 13/128; H04N 13/207
See application file for complete search history.

(56) References Cited

U.S. PATENT DOCUMENTS

| | | | | |
|---|---|---|---|---|
| 8,208,716 B2 * | 6/2012 | Choi | ...................... | G06T 7/593 |
| | | | | 382/106 |
| 10,540,818 B2 | 1/2020 | Akeley | | |
| 2010/0103249 A1 * | 4/2010 | Lipton | ................ | H04N 13/178 |
| | | | | 348/51 |
| 2017/0155885 A1 * | 6/2017 | Selstad | ...................... | G06T 7/20 |
| 2018/0288387 A1 * | 10/2018 | Somanath | ............ | H04N 13/271 |
| 2019/0220963 A1 * | 7/2019 | Popovic | ............... | H04N 13/243 |
| 2020/0273192 A1 * | 8/2020 | Cheng | ................. | G06V 10/454 |

FOREIGN PATENT DOCUMENTS

CN 111325794 A 6/2020

OTHER PUBLICATIONS

Japanese Office Action and english translation for Japanese Application No. 2023-134464 dated Nov. 5, 2024.

* cited by examiner

*Primary Examiner* — Rowina J Cattungal
(74) *Attorney, Agent, or Firm* — Young Basile Hanlon & MacFarlane, P.C.

(57) ABSTRACT

A method of generating stereoscopic display contents includes obtaining, from a Red, Green, Blue plus Distance (RGB-D) image using a processor, a first Red, Green, and Blue (RGB) image and a depth image; determining, based on depth values in the depth image, a first disparity map in accordance with the RGB-D image; determining a second disparity map and a third disparity map by transforming the first disparity map using a disparity distribution ratio; and generating, by the processor, the pair of stereoscopic images comprising a second RGB image and a third RGB image, wherein the second RGB image is generated by shifting a first set of pixels in the first RGB image based on the second disparity map, and the third RGB image is generated by shifting a second set of pixels in the first RGB image based on the third disparity map.

16 Claims, 5 Drawing Sheets

METHOD AND APPARATUS FOR GENERATING STEREOSCOPIC DISPLAY CONTENTS

TECHNICAL FIELD

This disclosure relates to stereo vision, and in particular, to generate stereoscopic display contents.

BACKGROUND

Virtual reality (VR), augmented reality (AR), and mixed reality (MR), as the next generation of human-computer interaction methods, are highly immersive and intuitive. Generating high quality stereoscopic images and videos are necessary for providing the most immersive VR, AR, and MR viewing experiences.

Currently, the perception of three-dimensional depth can be realized by generating two slightly different images to each eye using two or more cameras. However, this can be a complex and computing-intensive process. In addition, without accurate depth information, the generated VR, AR, and MR environment cannot provide a good viewing experience for people.

SUMMARY

Disclosed herein are implementations of methods, apparatuses, and systems for generating stereoscopic display contents.

In one aspect, a method of generating stereoscopic display contents is disclosed. The method includes obtaining, from a Red, Green, Blue plus Distance (RGB-D) image using a processor, a first Red, Green, and Blue (RGB) image and a depth image; determining, based on depth values in the depth image, a first disparity map in accordance with the RGB-D image, wherein the first disparity map comprises a plurality of disparity values for the first RGB image to be transformed to a pair of stereoscopic images; determining a second disparity map and a third disparity map by transforming the first disparity map using a disparity distribution ratio; and generating, by the processor, the pair of stereoscopic images comprising a second RGB image and a third RGB image, wherein the second RGB image is generated by shifting a first set of pixels in the first RGB image based on the second disparity map, and the third RGB image is generated by shifting a second set of pixels in the first RGB image based on the third disparity map.

In another aspect, an apparatus for generating stereoscopic display contents is disclosed. The apparatus includes a non-transitory memory; and a processor, wherein the non-transitory memory includes instructions executable by the processor to: obtain, from a Red, Green, Blue plus Distance (RGB-D) image, a first Red, Green, and Blue (RGB) image and a depth image; determine, based on depth values in the depth image, a first disparity map in accordance with the RGB-D image, wherein the first disparity map comprises a plurality of disparity values for the first RGB image to be transformed to a pair of stereoscopic images; determine a second disparity map and a third disparity map by transforming the first disparity map using a disparity distribution ratio; and generate, by the processor, the pair of stereoscopic images comprising a second RGB image and a third RGB image, wherein the second RGB image is generated by shifting a first set of pixels in the first RGB image based on the second disparity map, and the third RGB image is generated by shifting a second set of pixels in the first RGB image based on the third disparity map.

In another aspect, a non-transitory computer-readable storage medium configured to store computer programs for generating stereoscopic display contents is disclosed. The computer programs include instructions executable by a processor to: obtain, from a Red, Green, Blue plus Distance (RGB-D) image, a first Red, Green, and Blue (RGB) image and a depth image; determine, based on depth values in the depth image, a first disparity map in accordance with the RGB-D image, wherein the first disparity map comprises a plurality of disparity values for the first RGB image to be transformed to a pair of stereoscopic images; determine a second disparity map and a third disparity map by transforming the first disparity map using a disparity distribution ratio; and generate, by the processor, the pair of stereoscopic images comprising a second RGB image and a third RGB image, wherein the second RGB image is generated by shifting a first set of pixels in the first RGB image based on the second disparity map, and the third RGB image is generated by shifting a second set of pixels in the first RGB image based on the third disparity map.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
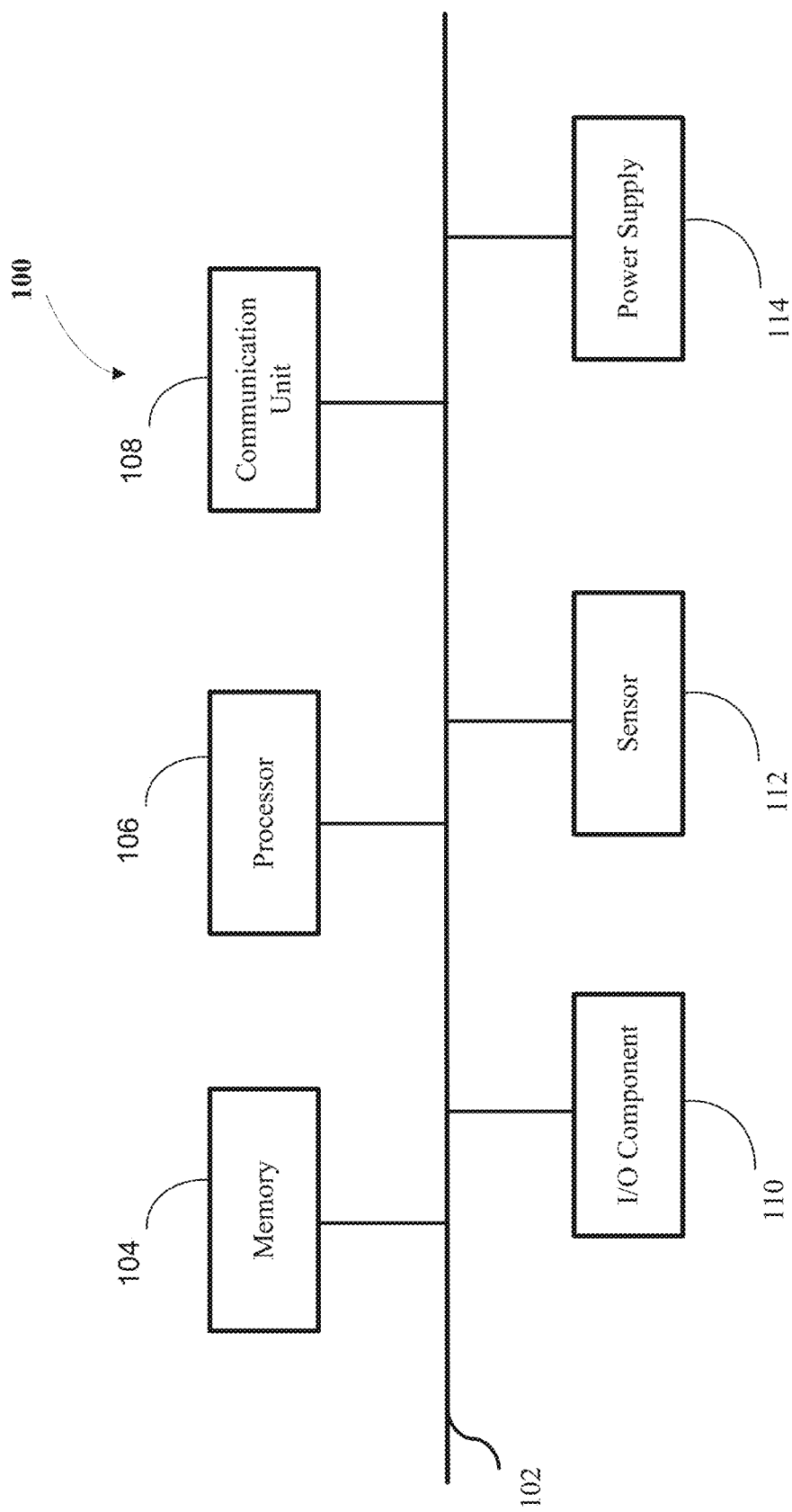
FIG. 1 is a diagram of an example block of an apparatus for computing and communication.

Virtual reality (VR), augmented reality (AR), and mixed reality (MR) techniques have been developed in some application areas, such as, for example, virtual tourism and travel, digital virtual entertainment (e.g., VR games and VR movies), virtual training and education, VR exposure therapy, etc. Meanwhile, VR/AR/MR devices such as VR headsets, VR helmets, and AR/MR apps and glasses have been used to simulate 3D immersive environments for people to get involved in. When a user with a VR/AR/MR headset moves his or her head, the simulated 3D environment follows the user's motion, which is displayed in front of the user.

The simulated 3D immersive environments can be realized by binocular vision. A person's left and right eyes see things from slightly different viewpoints. The different observed two-dimensional (2D) images are then processed by the brain to generate the perception of 3D depth. Based on binocular vision, stereo vision for VR/AR/MR is generated by using two 2D images as left and right eye inputs respectively (e.g., one image for the left eye and one image for the right eye). The two 2D images are obtained for the same scene by two cameras from different point of views. Traditionally the stereo vision display image pairs (e.g., one image for the left eye and one image for the right eye) used for Virtual Reality (VR)/Augmented Reality (AR)/Mixed Reality (MR) helmets/glasses are generated from using inverse rectification process. As 2D images do not contain distance/depth information, the 3D VR/AR/MR display contents generated from such process could cause a sense of incongruity or even 3D dizziness due to inaccurate distance estimation.

According to implementations of this disclosure, a method is used to generate VR/AR/MR 3D display contents using three-dimensional Red, Green, Blue plus Distance (RGB-D) images with accurate distance/depth information recorded from RGB-D sensors. The RGB-D sensors can include, for example, structured light based RGB-D sensors, active/passive stereo vision based RGB-D sensors, time-of-flight RGB-D sensors or any of their combinations, or the like. Traditional Red, Green, and Blue (RGB) image is a function of x-coordinate and y-coordinate, which only describes the distribution of RGB color values in a 2D image. For example, a pixel with display color of Red=1, Green=1, and Blue=1 located at (x, y) coordinate can be expressed as Pixel (x, y)=(1, 1, 1), which represents a black pixel at x and y coordinate on the image. An RGB-D image recorded from the RGB-D sensors provides additional depth information to each pixel of the RGB image. For example, a pixel with display color of Red=1, Green=1, and Blue=1 located at (x, y, z) coordinate can be expressed as Pixel (x, y)=(1, 1, 1, z), which represents a black pixel at x and y coordinate on the image and z units' distance (e.g., millimeters) away.

According to implementations of this disclosure, in order to generate stereoscopic display contents, an RGB-D sensor can be used to generate an RGB-D image. Based on the RGB-D image, a corresponding RGB image and a depth image can be obtained. The depth image indicates the distance information for an object corresponding to the pixel in the RGB image. Based on the triangulation relationship, a total disparity map for the RGB image can be generated by using the distances for each pixel in the RGB image, a focal length, and an interpupillary distance. The total disparity map is a 2D matrix, in which each element indicates a disparity value for a pixel in the RGB image. A left disparity map can be determined by a disparity distribution ratio k and the total disparity map. A right disparity map can be determined by the disparity distribution ratio k and the total disparity map. Therefore, a pair of stereoscopic images can be generated from the RGB image based on the left disparity map and the right disparity map. The pair of stereoscopic images includes a left eye image and a right eye image. The left eye image and the right eye image can be zoomed, cropped, or resized to generate a left display image and a right display image, according to display requirements of an augmented reality (AR), virtual reality (VR), or mixed reality (MR) device.

It should be noted that the applications and implementations of this disclosure are not limited to the examples, and alternations, variations, or modifications of the implementations of this disclosure can be achieved for any computation environment. Details of the disclosed methods, apparatus, and systems will be set forth below after an overview of the system and coding structures. Details of the disclosed methods and servers will be set forth below.

FIG. 1 is an example block diagram that illustrates internal components of an apparatus 100 for computing and communication according to implementations of this disclosure. As shown in FIG. 1, the apparatus 100 for computing and communication can include a memory 104, a processor 106, a communication unit 108, an input/output (I/O) component 110, a sensor 112, a power supply 114, and a bus 102. The bus 102 can be used to distribute internal signals. The bus 102 represents what may be one or more busses (such as an address bus, data bus, or combination thereof). The apparatus can be implemented by any configuration of one or more computing devices, such as a Red, Green, Blue plus Distance (RGB-D) camera, a bridge camera, a film camera, a smartphone camera, a fisheye camera, a microcomputer, a main frame computer, a general-purpose computer, a database computer, a special-purpose/dedicated computer, a remote server computer, a personal computer, a tablet computer, a laptop computer, a cell phone, an embedded computing/edge computing device, a single board computer, a ASIC (Application-specific integrated circuit) chip, a FPGA chip (Field-programmable gate array), a SoC (system on a chip) chip, a cloud computing device/service, or a wearable computing device. In some implementations, the different apparatuses can be implemented in the form of multiple groups of RGB-D cameras that are at different geographic locations and can communicate with one another, such as by way of a network. In some implementations, the different apparatuses are configured with different operations. In some implementations, the apparatus for computing and communication can carry out one or more aspects of the methods and system described herein. For example, special-purpose processors in RGB-D cameras including specialized chips can be used to implement one or more aspects or elements of the methods and system described herein.

FIG. 1 shows that the apparatus 100 for computing and communication includes a memory 104, a processor 106, a communication unit 108, an input/output (I/O) component 110, a sensor 112, a power supply 114, and a bus 102. In some implementations, the apparatus 100 for computing and communication can include any number of memory units, processor units, communication units, input/output (I/O) components, sensor units, power supply units, and bus units.

The memory 104 includes, but is not limited to, non-transitory computer readable media that stores program code and/or data for longer periods of time such as secondary or persistent long term storage. The memory 104 can retrieve data, store data, or both. The memory 104 herein can be a read-only memory (ROM) device, a hard drive, a random-access memory (RAM), a flash drive, a SSD (solid state drive), a EMMC (embedded multimedia card), an optical/magnetic disc, a security digital (SD) card, or any combination of any suitable type of storage device.

The processor 106 can be used to manipulate or process information that can be received from the memory 104, the communication unit 108, the I/O component 110, the sensor 112, or a combination thereof. In some implementations, the processor 106 can include a digital signal processor (DSP), a central processor (e.g., a central processing unit or CPU), an application-specific instruction set processor (ASIP), an embedded computing/edge computing device, a single board computer, a ASIC (Application-specific integrated circuit) chip, a FPGA chip (Field-programmable gate array), a SoC (system on a chip) chip, a cloud computing service, a graphics processor (e.g., a graphics processing unit of GPU). The processor 106 can access computer instructions stored in the memory 104 via the bus 102. In some implementations, one or more processors can be used to speed up data processing that includes executing or processing computer instructions to perform one or more aspects of the methods and system described herein. The output data from the processor 106 can be distributed to the memory 104, the communication unit 108, the I/O component 110, the sensor 112 via the bus 102. The processor 106 can be any type of device or devices that can be operable to control the apparatus 100 for computing and communication to perform one or more configured or embedded operations.

In addition to the processor 106 and the memory 104, the apparatus 100 can include the sensor 112. For example, one or more conditions of the operational environment of the apparatus 100 can be detected, captured, or determined by the sensor 112. In some implementations, the sensor 112 can include one or more charge-coupled devices (CCD), active-pixel sensor (CMOS sensor), or other visible or non-visible light detection and capture units. The captured data for the sensed aspects of the operational environment of the apparatus 100 for computing and communication can be transmitted from the sensor 112 to the memory 104, the processor 106, the communication unit 108, the input/output (I/O) component 110, the power supply 114, and the bus 102. In some implementations, multiple sensors can be included in the apparatus 100, such as, for example, a lidar unit, a microphone, an RGB-D sensing device, an ultrasound unit, or a pressure sensor. The sensors mentioned above can capture, detect, or determine one or more conditions of the operational environment of the apparatus 100 for computing and communication.

In addition to the processor 106 and the memory 104, the apparatus 100 can include the I/O component 110. The I/O component 110 can receive user input. The I/O component 110 can transmit the user input to the bus 102, the power supply 114, the memory 104, the communication unit 108, the sensor 112, the processor 106, or a combination thereof. The I/O component 110 can provide a visual output or display output to an individual. In some implementations, the I/O component 110 can be formed of a communication device for transmitting signals and/or data.

In addition to the processor 106 and the memory 104, the apparatus 100 can include a communication unit 108. The apparatus 100 can use the communication unit 108 to communicate with another device using wired or wireless communication protocols through one or more communications networks such as cellular data networks, wide area networks (WANs), virtual private networks (VPNs), or the Internet.

In addition to the processor 106 and the memory 104, the apparatus 100 can include the power supply 114. The power supply 114 can provide power to other components in the apparatus 100, such as the bus 102, the memory 104, the communication unit 108, the sensor 112, the processor 106, and the I/O component 110 via the bus 102. In some implementations, the power supply 114 can be a battery, such as a rechargeable battery. In some implementations, the power supply 114 can include a power input connection that can receives energy from an external power source.

In addition to the processor 106 and the memory 104, the apparatus 100 can include the bus 102. Power signals from the power supply 114 and internal data signals can be distributed among the memory 104, the communication unit 108, the sensor 112, the processor 106, the I/O component 110, and the power supply 114 via the bus 102.

It should be noted that parts or components of the apparatus and systems for generating stereoscopic display contents can include elements not limited to those shown in FIG. 1. Without departing from the scope of this disclosure, the apparatus and systems for generating stereoscopic display contents can include more or fewer parts, components, and hardware or software modules for performing various functions in addition or related to generating stereoscopic display contents.

Figure 2:
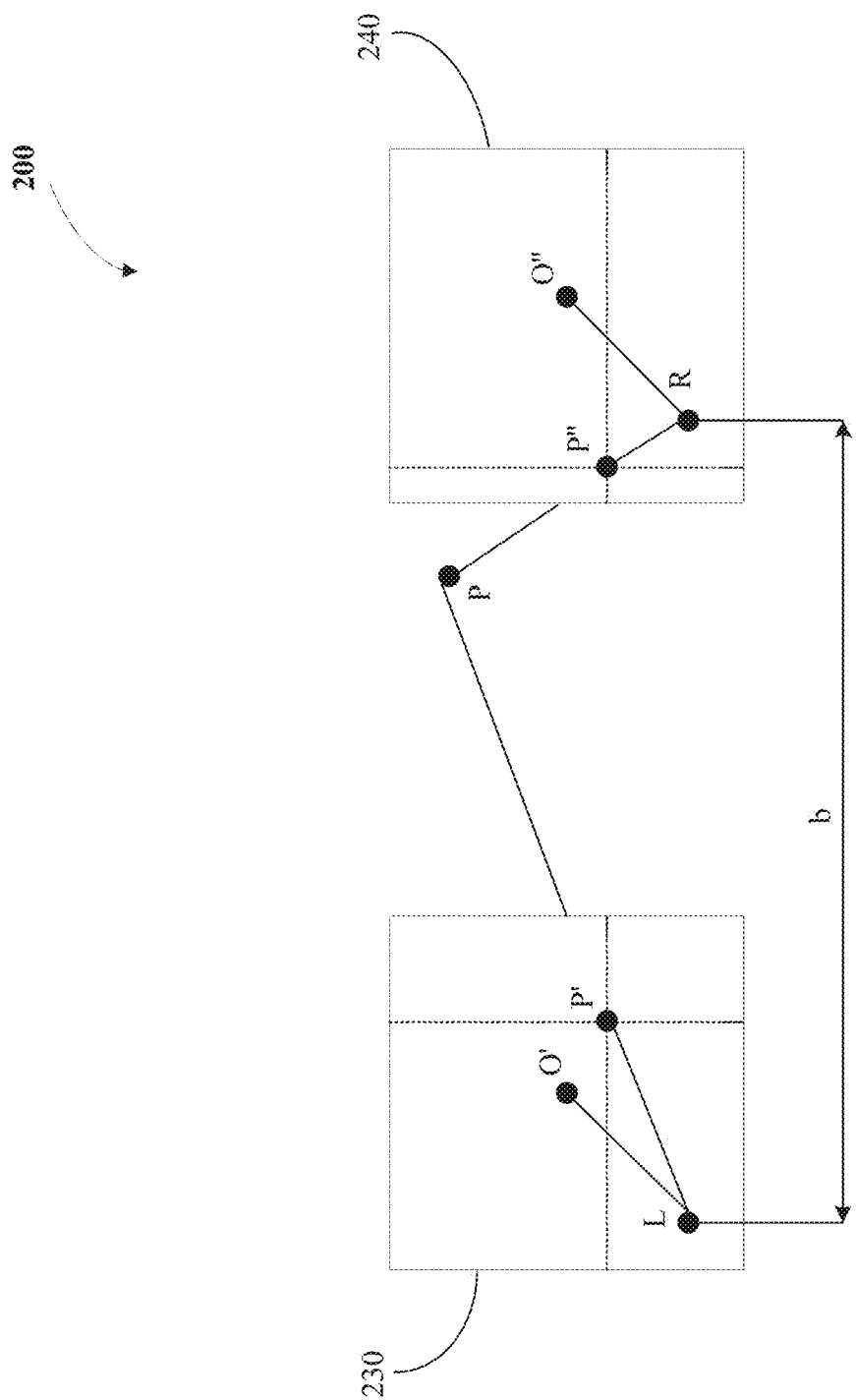
FIG. 2 is an example diagram for illustrating binocular stereo vision principle.

FIG. 2 shows an example diagram 200 for illustrating binocular stereo vision principle. The diagram 200 includes a left image 230, a right image 240, a left optical center O' (0, 0), a right optical center O'' (0,0), a left focus point $L=(X_L, Y_L, Z_L)$, a right focus point $R=(X_R, Y_R, Z_R)$, and a target point P=(Xc, Yc, Zc). The left optical center O' is a pixel point at the center of the left image 230. The right optical center O'' is another pixel point at the center of the right image 240. The pixel coordinate for the left optical center O' is (0, 0) in the left image 230. The pixel coordinate for the right optical center O'' is (0, 0) in the right image 240. The target point P as a world coordinate point (e.g., a 3D point) can be transformed and projected as a 2D coordinate point $P'=(X_{left}, Y)$ in the left image 230 through the left focus point L. Through the right focus point R, the target point P can be transformed and projected as another 2D coordinate point $P''=(X_{right}, Y)$ in the right image 240. The distance between the left focus point L and right focus point R is a baseline b.

The 2D coordinate point P' and the 2D coordinate point P'' are two projected points, respectively in the left image 230 and in the right image 240, for the same target point P. The difference of horizontal coordinates between the P' and P'' in the left image 230 and right image 240 (e.g., the disparity: $d=X_{left}-X_{right}$) can be utilized to evaluate the distance between the target point P and the two focus points (e.g., the left focus point L and the right focus point R). In some implementations, the target point P is a 3D world coordinate point in a 3D object. Each 3D world coordinate point in the 3D object can be projected both in the left image 230 and in the right image 240. The corresponding pixels for the 3D object can be found and matched between the left image 230 and the right image 240. The disparity (e.g., the disparity for the target point P: $d=X_{left}-X_{right}$) for each pixel can be computed, and based on the calculated disparities, a disparity map can be generated for the 3D object. The 3D object in world coordinate system can be reconstructed using the disparity map.

In some implementations, a human's left eye can be the left focus point L. The human's right eye can be the right focus point R. The human's left eye and right eye have a slightly different view of the world around. In that case, the baseline b is the pupillary distance (e.g., 50-75 mm) between the left eye and the right eye. The target point P can be any world coordinate point that the human observes. The target point P can be projected both in the human's left eye image and right eye image. The disparity of the corresponding pixel between the left eye image and the right eye image can be used to calculate the distance between the target point P and the human. In that case, the left eye image and the right eye image as a pair of stereoscopic images can be used by the human's brain to generate stereo vision for the world around.

In some implementations, two cameras (e.g., a left camera and a right camera) at different positions can generate the left image 230 and the right image 240 that includes different 2D pixels for the same 3D object. The focus point of the left camera can be the left focus point L. The focus point of the right camera can be the right focus point R. The distance between the two focus points of the left camera and the right camera can be the baseline b. In some cases, if the left camera and the right camera are not placed horizontally, the left image 230 and the right image 240 can be calibrated to correctly indicate a disparity map for all pixels both in the left image 230 and the right image 240. The disparity map for the left image 230 and the right image 240 can be used to generate a depth information for each pixel in order to reconstruct a 3D environment captured by the left camera and the right camera.

In some implementations, a stereo camera with two or more image sensors can be used to generate the left image 230 and the right image 240 that includes different 2D pixels for the same 3D object. For example, if a stereo camera includes two image sensors (e.g., a left image sensor and a right image sensor), the stereo camera can be used to reconstruct 3D objects with depth information. The left image sensor can be used to generate the left image 230. The right image sensor can be used to generate the right image 240. The horizontal distance between the left image senor and the right image sensor can be the baseline b. The disparity map can be calculated based on the left image 230 and the right image 240 that represents slightly different view of the world around.

In general, the realization of binocular stereo vision is based on the principle of parallax (e.g., the disparity). For example, in FIG. 2, two images (e.g., the left image 230 and the right image 240) are row-aligned, which means that the left image 230 and the right image 240 are in the same plane. The target point P can be projected in the left image 230 and the right image 240, respectively, with different pixel coordinates. The difference of the pixel coordinates (e.g., the disparity: $d=X_{left}-X_{right}$) can be used to calculate the distance between the target point P and the two images (e.g., the left image 230 and the right image 240). The calculated distance information can be used to reconstruct 3D objects in the world around.

Figure 3:
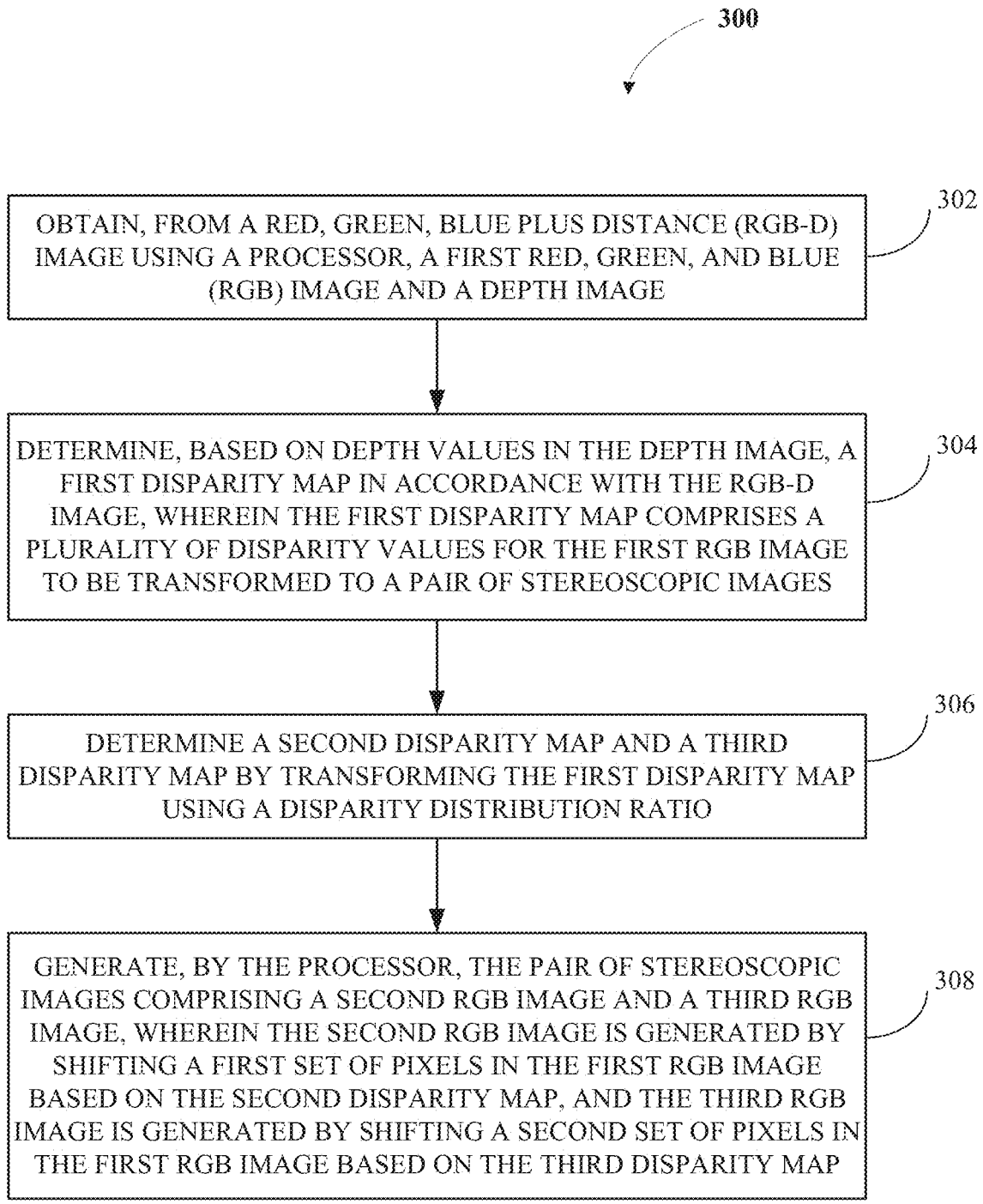
FIG. 3 is a flowchart of an example process for generating stereoscopic display contents according to some implementations of this disclosure.

FIG. 3 is a flowchart of an example process 300 for generating stereoscopic display contents according to some implementations of this disclosure. The process 300 can be implemented as software and/or hardware modules in the apparatus 100 in FIG. 1. For example, the process 300 can be implemented as software modules stored in the memory 104 as instructions and/or data executable by the processor 106 of a camera, such as the apparatus 100 in FIG. 1. In another example, the process 300 can be implemented in hardware as a specialized chip storing instructions executable by the specialized chip. Some or all of the operations of the process 300 can be implemented using a disparity map such as the one described below in connection with FIG. 4. As described above, all or a portion of the aspects of the disclosure described herein can be implemented using a general-purpose computer/processor with a computer program that, when executed, carries out any of the respective techniques, algorithms, and/or instructions described herein. In addition, or alternatively, for example, a special-purpose computer/processor, which can contain specialized hardware for carrying out any of the techniques, algorithms, or instructions described herein, can be utilized.

At an operation 302, a first Red, Green, and Blue (RGB) image and a depth image can be obtained from a Red, Green, Blue plus Distance (RGB-D) image using a processor. For example, the processor can be a processor 106 in FIG. 1. In some cases, the sensor 112 of the apparatus 100 in FIG. 1 can be used to obtain an RGB-D image in an operational environment of the apparatus 100. The RGB-D image can be transmitted through the bus 102 to the processor 106 to obtain a RGB image and a depth image. The depth image indicates the distance information for a corresponding object (or multiple corresponding objects) in the RGB image.

Figure 5:
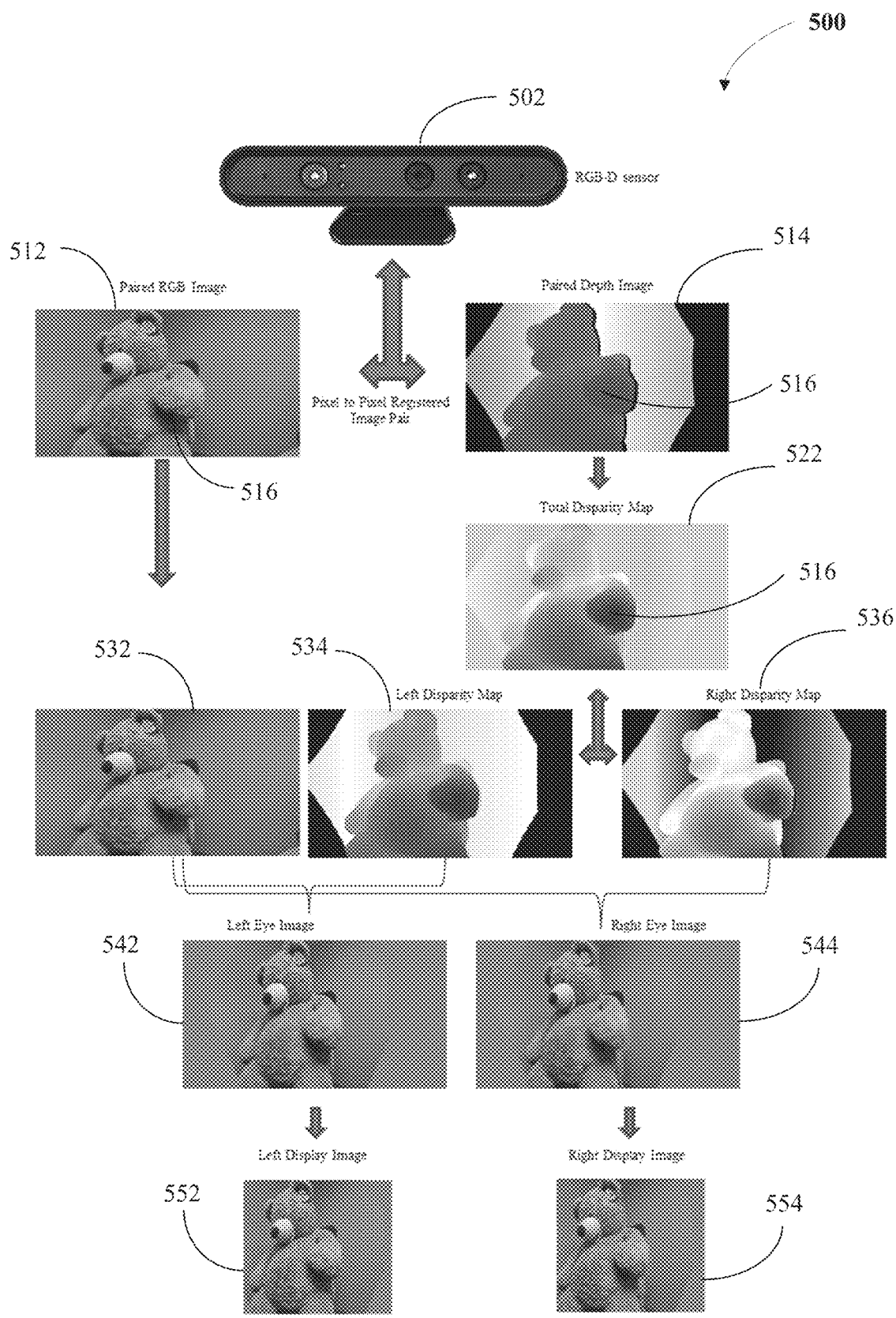
FIG. 5 is an example flow diagram for generating a pair of stereoscopic images according to some implementations of this disclosure.

Using FIG. 5 as an example, an RGB-D image can be obtained by an RGB-D sensor 502. The RGB-D image can be processed to obtain a RGB image 512 and a depth image 514 by any technique. In some implementations, the RGB-D image can be captured by an RGB-D sensor. For example, the RGB-D sensor can be the sensor 112 in FIG. 1. The RGB image 512 can include various objects such as, for example, humans, animals, sofas, desks, and other objects. In the depth image 514, different shades are used to indicate different distances in FIG. 5, in which the darker shade indicates a closer distance. The depth image 514 indicates the distances for corresponding objects in the RGB image 512.

In some implementations, a pixel in the depth image indicates a distance between the RGB-D sensor and a corresponding object captured in the RGB-D image. For example, a pixel in the RGB-D image can correspond to a pixel in the depth image. The pixel in the RGB-D image indicates a point that belongs to an object. A corresponding pixel in the same location in the depth image can indicate a distance between the corresponding object and the RGB-D sensor.

In the example of FIG. 5, a pixel in the depth image 514 indicates a distance between the RGB-D sensor 502 and a corresponding object captured in the RGB image 512. The corresponding object can include, for example, an object 516 (e.g., a toy bear) in FIG. 5. Each pixel in the RGB image 512 can be associated with an object (e.g., the object 516). The corresponding pixel in the depth image 514 for each pixel in the RGB image 512 indicates a distance between the RGB-D sensor 502 and the corresponding object.

Back to FIG. 3, at an operation 304, a first disparity map in accordance with the RGB-D image can be determined based on depth values in the depth image, wherein the first disparity map comprises a plurality of disparity values for the first RGB image to be transformed to a pair of stereoscopic images. In some cases, the first disparity map includes a plurality of disparity values for the first RGB image, in which the disparity values can be used to generate a pair of stereo vision images.

Figure 4:
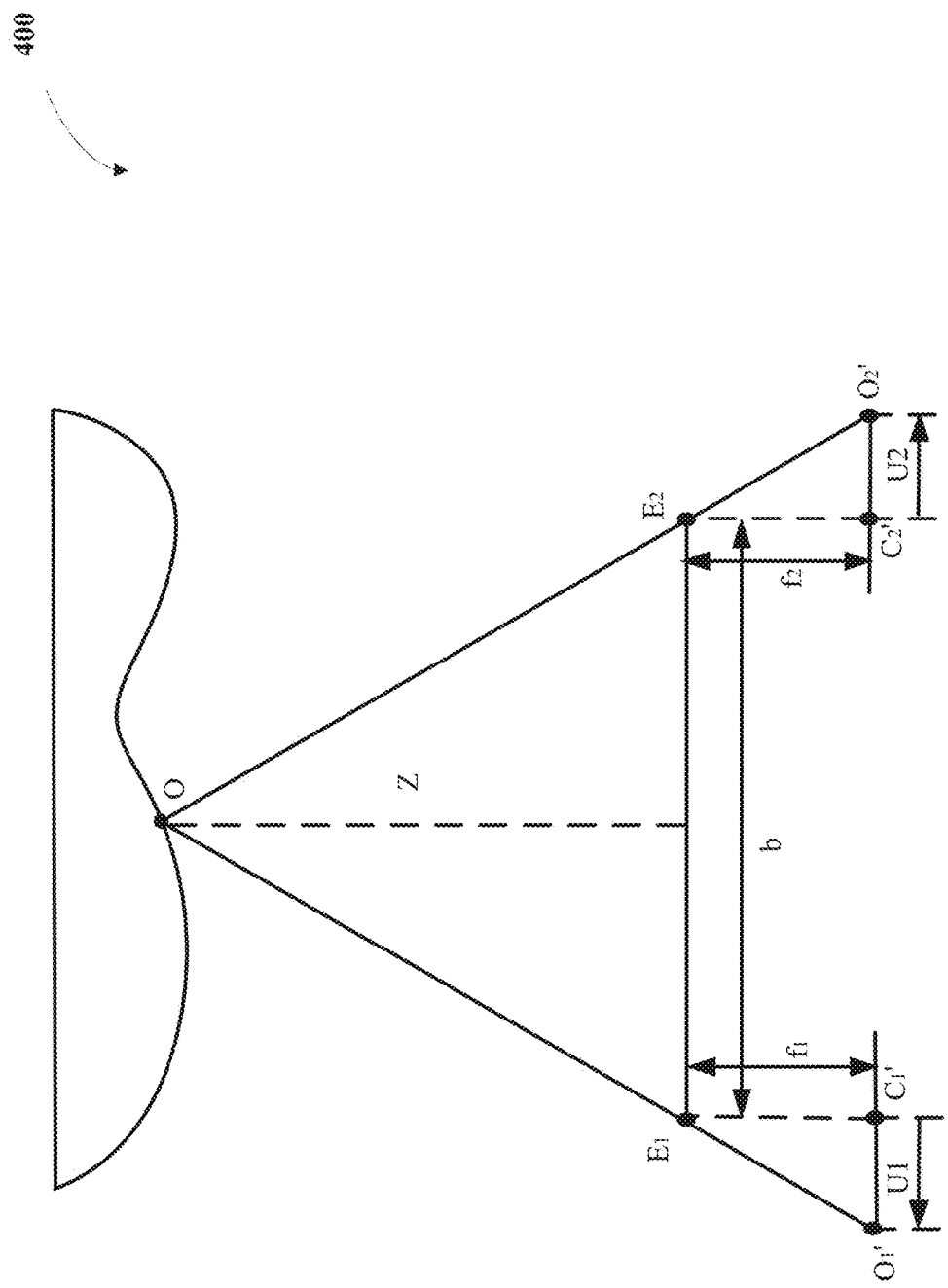
FIG. 4 is an example for determining disparity value for a human's left eye and right eye according to some implementations of this disclosure.

The disparity values for each pixel can be determined based on the depth values in the depth image using FIG. 4 as an example. FIG. 4 is a diagram for showing an example of determining disparity value for a human's left eye and right eye according to some implementations of this disclosure. For example, in FIG. 4, a distance for a target point O is a distance Z, and the disparity value for the target point O is $f*b/Z$, in which f is a focal length, b is an interpupillary distance between a left eye $E_1$ and a right eye $E_2$, and Z is a distance between the target point O and an RGB-D sensor. From the triangulation relationship in FIG. 4, for each pixel in the first RGB image, a corresponding disparity value can be determined (e.g., $f*b/Z$). In general, based on the triangulation relationship, the depth values of each pixel in the depth image, a focal length and an interpupillary distance can be used to determine the disparity values for each pixel in the first RGB image (e.g., a RGB image). According to FIG. 4, the disparity values in the first disparity map can be determined, for example, using Equation (5) to be discussed below.

In the example of FIG. 5, an RGB-D image can be obtained by the RGB-D sensor 502. A pixel in the depth image 514 indicates a distance (i.e., depth) between a corresponding object in the RGB image 512 and the RGB-D sensor. For example, the distance for the object 516 in the RGB image 512 is displayed in the depth image 514. Based on the depths of each pixel in the depth image 514, a total disparity map 522 can be determined for the RGB image 512. In some implementations, the total disparity map 522 can be determined using an interpupillary distance between the left eye and the right eye, depth values for each pixel, and the focal length of the RGB-D sensor. For example, the total disparity map 522 can be determined using Equation (5) as will be described below. For example, the object 516 are shown in the total disparity map 522 of FIG. 5 as disparity values represented by greyscales. The total disparity map 522 can then be used to transform the RGB image to a pair of stereoscopic images (e.g., a left eye image 542 and a right eye image 544), as discussed below.

In some implementations, the first disparity map is a two-dimensional (2D) matrix wherein each element indicates a disparity value. Using FIG. 5 as an example, a first disparity map (e.g., a total disparity map 522) can be determined based on the depth image 514 and the RGB image 512. The total disparity map 522 can be a 2D matrix, in which each element indicates a disparity value for a pixel in the RGB image 512.

In some implementations, the first disparity map can be determined using at least one of a focal length for an interpupillary distance b. Using FIG. 4 as an example, a disparity value $$\left(e.g., f*\left(\frac{b}{z(x, y)}\right)\right)$$

in the first disparity map for the target point O can be determined based on the focal length f, the interpupillary distance b between the left eye $E_1$ and the right eye $E_2$, and the distance Z. For example, the disparity value can be determined using Equation (5) discussed below.

In the example of FIG. 5, a pixel in the RGB image 512 is associated with a distance in the depth image 514. A focal length f or an interpupillary distance b can be predefined from public data or set up by manual input. The focal length f and the interpupillary distance b with the distances can be used to determine a total disparity map 522 for the RGB image 512.

Back to FIG. 3, at an operation 306, a second disparity map and a third disparity map can be determined by transforming the first disparity map using a disparity distribution ratio. In other words, the second and third disparity maps can be determined based on the same original disparity map using the disparity distribution ratio. In some implementations, the first disparity map can be transformed into the second disparity map using, for example, Equation (1) and the third disparity map based on the disparity distribution ratio k using, for example, Equation (2) below.

$$d_L(x, y) = k*d(x, y) = k*\left(\frac{f*b}{z(x, y)}\right) \quad \text{Equation (1)}$$

$$d_R(x, y) = (k-1)*d(x, y) = (k-1)*\left(\frac{f*b}{z(x, y)}\right) \quad \text{Equation (2)}$$

wherein $d_L(x, y)$ is the disparity value in the second disparity map and $d_R(x, y)$ is the disparity value in the third disparity map. d(x, y) is the disparity value in the first disparity map, z(x, y) indicates a distance between the RGB-D sensor and a corresponding object associated with the pixel (x, y) in the RGB image, and k is the disparity distribution ratio, wherein the disparity distribution ratio k can be a constant value indicative of a position of an observation point between a left eye and a right eye. In some implementations, the disparity distribution ratio k can be a pre-set constant value.

In some implementations, the second disparity map and the third disparity map can be determined from the first disparity map in other ways without using Equations (1) and (2). For example, the second disparity map and the third disparity map can be determined using an offset in addition to the disparity distribution ratio k.

The disparity value d(x, y) for the first disparity map can be determined, for example, using Equation (5) discussed below, in which f is a focal length and b is an interpupillary distance between a left eye and a right eye.

Using FIG. 4 as an example, the disparity value d(x, y) in the first disparity map for the target point O can be determined based on the focal length f (e.g., $f=f_1=f_2$), the interpupillary distance b, and the distance Z. Based on the disparity distributed ratio k, the disparity value $d_L(x, y)$ in the second disparity map and the disparity value $d_R(x, y)$ in the third disparity map can be determined using Equations (1) and (2), as discussed above, for the target point O.

In the example of FIG. 5, based on the RGB image 512 and the depth image 514, a total disparity map 522 can be determined. Based on the disparity distribution ratio k, a left disparity map 534 and a right disparity map 536 can be determined using Equations (3) and (4) discussed below, respectively. The left disparity map 534 and the right disparity map 536 can be used to transform the RGB image into a pair of stereoscopic images.

Back to FIG. 3, at an operation 308, the pair of stereoscopic images comprising a second RGB image and a third RGB image can be generated by the processor, wherein the second RGB image is generated by shifting a first set of pixels in the first RGB image based on the second disparity map, and the third RGB image is generated by shifting a second set of pixels in the first RGB image based on the third disparity map.

The disparity values in the second disparity map and in the third disparity map can be used to horizontally shift pixels in the first RGB image to left or right to generate the second RGB image and third RGB image. In some implementations, the processor (e.g., the processor 106) can generate the second RGB image (e.g., the left eye image 542 in FIG. 5) by shifting the first set of pixels in the first RGB image (e.g., the RGB image 532 in FIG. 5) based on the second disparity map (e.g., the left disparity map 534 in FIG. 5) using Equation (3). The processor can generate the third RGB image (e.g., the right eye image 544 in FIG. 5) by shifting the second set of pixels in the first RGB image (e.g., the RGB image 532 in FIG. 5) based on the third disparity map (e.g., the right disparity map 536 in FIG. 5) using Equation (4).

$$\text{Pixel}_L(x,y)=\text{Pixel}(x+d_L,y)=(R(x+d_L,y),G(x+d_L,y),B(x+d_L,y)) \quad \text{Equation (3)}$$

$$\text{Pixel}_R(x,y)=\text{Pixel}(x+d_R,y)=(R(x+d_R,y),G(x+d_R,y),B(x+d_R,y)) \quad \text{Equation (4)}$$

In Equations (3) and (4), $\text{Pixel}_L(x, y)$ is a pixel (x, y) in the second RGB image, $\text{Pixel}_R(x, y)$ is a pixel (x, y) in the third RGB image, Pixel (x, y) is a pixel (x, y) in the first RGB image, (R(x,y), G(x,y), B(x,y)) is a RGB color for the pixel (x, y), $d_L$, which refers to $d_L(x, y)$ in Equation (1), indicates a disparity value in the second disparity map, and $d_R$, which refers to $d_R(x, y)$, indicates a disparity value in the third disparity map.

In some implementations, the disparity values in the second disparity map and the third disparity map can be determined in other ways without using Equations (3) and (4). In some implementations, for example, an additional pixel or additional pixels can be added to the top or bottom in addition to the horizontal shifting described above to determine the disparity values. In some implementations, the additional pixel(s) can be added to the left or right in addition to the horizontal shifting.

Using FIG. 5 as an example, the RGB image 532 can be the first RGB image. The left disparity map 534 can be the second disparity map. The right disparity map 536 can be the third disparity map. The left disparity map 534 and the right disparity map 536 can be determined by transforming the total disparity map 522 based on the disparity distribution ratio k, as discussed above. Based on the left disparity map 534, the left eye image 542 can be generated by transforming the first set of pixels in the RGB image 532. For example, Equation (3) can be used with the left disparity map 534 to generate the left eye image 542. Equation (4) can be used with the right disparity map 536 to generate the right eye image 544. The left eye image 542 and the right eye image 544 can be the pair of stereoscopic images.

In some implementations, a pair of adjusted display images resized to display requirements of an augmented reality (AR), virtual reality (VR), or mixed reality (MR) device can be generated based on the pair of stereoscopic images by the processor (e.g., the processor 106). Using FIG. 5 as an example, the pair of stereoscopic images includes the left eye image 542 and the right eye image 544. The pair of adjusted display images resized to display requirements of the augmented reality (AR), virtual reality (VR), or mixed reality (MR) device can include, for example, a left display image 552 and a right display image 554, which can be generated based on the left eye image 542 and the right eye image 544.

FIG. 4 is a diagram of an example disparity calculation 400 for a human's left eye and right eye according to some implementations of this disclosure. FIG. 4 can include a left eye $E_1$, a right eye $E_2$, a target point O, an interpupillary distance b between the left eye $E_1$ and the right eye $E_2$, a distance Z between the target point O and a RGB sensor, a focal length $f_1$ for the left eye $E_1$, a focal length $f_2$ for the right eye $E_2$, a projected point $O_1'$ of the target point O in the left eye $E_1$ image plane, a projected point $O_2'$ of the target point O in the right eye $E_2$ image plane, an origin point $C_1'$ in the left eye $E_1$ image plane, and an origin point $C_2'$ in the right eye $E_2$ image plane. Without loss of generality, the left eye focal length $f_1$ is equal to the right eye focal length $f_2$, in which both $f_1$ and $f_2$ are equal to f.

The human's left eye $E_1$ and right eye $E_2$ are horizontally separated by the interpupillary distance b. Thus, the target point O can be projected in different positions (e.g., the projected point $O_1'$ and the projected point $O_2'$) in the left eye $E_1$ image plane and the right eye $E_2$ image plane, respectively. The projected point $O_1'$ is projected at left side of the origin point $C_1'$ in the left eye $E_1$ image plane. The pixel distance between the projected point $O_1'$ and the origin point $C_1'$ in the left eye $E_1$ image plane is $U_1$. The projected point $O_2'$ is projected at right side of the origin point $C_2'$ in the right eye $E_2$ image plane. The pixel distance between the projected point $O_2'$ and the origin point $C_2'$ in the right eye $E_2$ image plane is U2. The pixel location difference is a disparity value for the target point O. Every pixel in the left eye $E_1$ image plane can be matched to a pixel in the same location in the right eye $E_2$ image plane. A disparity map can be generated based on the pixel location differences between the left eye $E_1$ image plane and the right eye $E_2$ image plane.

In some implementations, each pixel in the depth image indicates a distance between a RGD sensor and a corresponding object. For example, in FIG. 4, the distance for the target point O is the distance Z. The pixel distance difference between the projected point $O_1'$ and the projected point $O_2'$ is $|U1|+|U2|$. From the triangulation relationship in FIG. 4, $|U1|+|U2|$. is equal to $(b*f)/Z$, in which the b is the interpupillary distance between the left eye $E_1$ and the right eye $E_2$, f is the focal length for the left eye $E_1$ and the right eye $E_2$, and Z is the distance between the target point O and the RGB sensor. Thus, b/z*f is the disparity value for the target point O. The disparity values for each pixel in the RGB image can be determined using the triangulation relationship with the depth values of each pixel in the depth image, a focal length and an interpupillary distance. A disparity map can be obtained for all pixels in the left eye $E_1$ image plane and the right eye $E_2$ image plane, for example, using the following equation:

$$d(x, y) = f * \left( \frac{b}{z(x, y)} \right) \qquad \text{Equation (5)}$$

In Equation (5), z(x, y) indicates a distance between the RGB-D sensor and a corresponding object associated with the pixel (x, y) in the RGB image. z(x, y) can be obtained from the depth image generated by the RGB-D sensor. The f (e.g., $f=f_1=f_2$) in Equation (5) is the focal length for the left eye $E_1$ and the right eye $E_2$. d(x, y) indicates each element in the disparity map. In some implementations, the calculation of the disparity map, according to FIG. 3, for example, can be performed at the operation 304.

FIG. 5 is an example workflow for generating a pair of stereoscopic images according to some implementations of this disclosure. One or more than one RGB-D sensors (e.g., an RGB-D sensor 502) can be used to obtain an RGB-D image. An RGB image 512 and a depth image 514 can be obtained from the obtained RGB-D image. The depth image 514 indicates the distances for corresponding objects in the RGB image 512. For example, an object 516 is displayed in the RGB image 512 and the distances for the object 516 are indicated in the depth image 514. In some implementations, according to FIG. 3, for example, obtaining the RGB-D image can be performed at the operation 302.

A total disparity map 522 can be determined, for example, for the RGB image 512 based on the distances in the depth image 514. The disparity values in the total disparity map 522 for the RGB image 512 can be calculated based on the distances in the depth image 514, a focal length, and an interpupillary distance (e.g., a focal length $f=f_1=f_2$ and an interpupillary distance b in FIG. 4). The disparity values in the total disparity map 522 for the RGB image 512 can be calculated, for example, using Equation (5) with the triangulation relationship based on the distances in the depth image 514, the focal length, and the interpupillary distance. For example, some pixels for the object 516 in the total disparity map 522 indicates disparity values for the object 516. In some implementations, according to FIG. 3, for example, determining the total disparity map 522 can be performed at the operation 304.

A left disparity map 534 can be determined based on a disparity distribution k by transforming the total disparity map 522. A right disparity map 536 can be determined based on the disparity distribution k by transforming the total disparity map 522. Based on the disparity distribution k, the disparity values in the total disparity map 522 can be allocated to the left disparity map 534 and the right disparity map 536 in a certain portion. For example, the left disparity map 534 and the right disparity map 536 can be determined using the disparity distribution k. As previously discussed, Equations (1) and (2) can be used for determining the disparity maps. In some implementations, according to FIG. 3, for example, determining the left disparity map 534 and the right disparity map 536 can be performed at the operation 306.

A pair of stereoscopic images can be generated based on the left disparity map 534 and the right disparity map 536. The left eye image 542 can be generated based on the left disparity map 534 by transforming a set of pixels in the RGB image 532 (e.g., the RGB image 512). The right eye image 544 can be generated based on the right disparity map 536 by transforming another set of pixels in the RGB image 532 (e.g., the RGB image 512). The left eye image 542 and the right eye image 544 are the pair of stereoscopic images. The left eye image 542 can be generated using Equation (3) to horizontally shifting the set of pixels in the RGB image 532. The right eye image 544 can be generated using Equation (4) to horizontally shifting the set of pixels in the RGB image 532. In some implementations, according to FIG. 3, for example, generating the pair of stereoscopic images can be performed at the operation 308.

The left eye image 542 and the right eye image can be zoomed and cropped to be resized to generate the left display image 552 and the right display image 554 that satisfy display requirements of an augmented reality (AR), virtual reality (VR), or mixed reality (MR) device.

The aspects of the disclosure described herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, such as, for example, memory elements, processing elements, logic elements, look-up tables, and the like, which can carry out a variety of functions under the control of one or more microprocessors or other control devices. Similarly, where the elements of the described aspects are implemented using software programming or software elements, the disclosure can be implemented with any programming or scripting languages, such as C, C++, Java, assembler, or the like, with the various algorithms being implemented with any combination of data structures, objects, processes, routines, or other programming elements. Functional aspects can be implemented in algorithms that execute on one or more processors. Furthermore, the aspects of the disclosure could employ any number of conventional techniques for electronics configuration, signal processing and/or control, data processing, and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media and can include RAM or other volatile memory or storage devices that can change over time. A memory of an apparatus described herein, unless otherwise specified, does not have to be physically contained in the apparatus, but is one that can be accessed remotely by the apparatus, and does not have to be contiguous with other memory that might be physically contained in the apparatus.

Any of the individual or combined functions described herein as being performed as examples of the disclosure can be implemented using machine-readable instructions in the form of code for operation of any or any combination of the aforementioned hardware. The computational codes can be implemented in the form of one or more modules by which individual or combined functions can be performed as a computational tool, the input and output data of each module being passed to/from one or more further modules during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. Moreover, use of the term "an aspect" or "one aspect" throughout this disclosure is not intended to mean the same aspect or implementation unless described as such.

As used in this disclosure, the term "or" is intended to mean an inclusive "or" rather than an exclusive "or" for the two or more elements it conjoins. That is unless specified otherwise or clearly indicated otherwise by the context, "X includes A or B" is intended to mean any of the natural inclusive permutations thereof. In other words, if X includes A; X includes B; or X includes both A and B, then "X includes A or B" is satisfied under any of the foregoing instances. Similarly, "X includes one of A and B" is intended to be used as an equivalent of "X includes A or B." The term "and/or" as used in this disclosure is intended to mean an "and" or an inclusive "or." That is, unless specified otherwise or clearly indicated otherwise by the context, "X includes A, B, and/or C" is intended to mean that X can include any combinations of A, B, and C. In other words, if X includes A; X includes B; X includes C; X includes both A and B; X includes both B and C; X includes both A and C; or X includes all of A, B, and C, then "X includes A, B, and/or C" is satisfied under any of the foregoing instances. Similarly, "X includes at least one of A, B, and C" is intended to be used as an equivalent of "X includes A, B, and/or C."

The use of the terms "including" or "having" and variations thereof herein is meant to encompass the items listed thereafter and equivalents thereof as well as additional items. Depending on the context, the word "if" as used herein can be interpreted as "when," "while," or "in response to."

The use of the terms "a" and "an" and "the" and similar referents in the context of describing the disclosure (especially in the context of the following claims) should be construed to cover both the singular and the plural. Furthermore, unless otherwise indicated herein, the recitation of ranges of values herein is intended merely to serve as a shorthand method of referring individually to each separate value falling within the range, and each separate value is incorporated into the specification as if it were individually recited herein. Finally, the operations of all methods described herein are performable in any suitable order unless otherwise indicated herein or otherwise clearly contradicted by the context. The use of any and all examples, or language indicating that an example is being described (e.g., "such as"), provided herein is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These headings and subheadings are not intended, and should not be used, to affect the interpretation of the claims or limit their scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method of generating stereoscopic display contents, comprising:
    obtaining, from a Red, Green, Blue plus Distance (RGB-D) image using a processor, a first Red, Green, and Blue (RGB) image and a depth image;
    determining, based on depth values in the depth image, a first disparity map in accordance with the RGB-D image using at least one of a focal length f or an interpupillary distance b, wherein the first disparity map comprises a plurality of disparity values for the first RGB image to be transformed to a pair of stereoscopic images;
    determining a left disparity map and a right disparity map by transforming the first disparity map using a disparity distribution ratio k, wherein the left disparity map is determined based on $$d_L(x, y) = k * d(x, y) = k * \left(\frac{f * b}{z(x, y)}\right),$$

and the right disparity map is determined based on $$d_R(x, y) = (k-1) * d(x, y) = (k-1) * \left(\frac{f * b}{z(x, y)}\right),$$

wherein $z(x,y)$ represents the depth value of a pixel $(x,y)$ in the RGB-D image, $d(x, y)$ represents the disparity value in the first disparity map, $d_L(x, y)$ represents the disparity value in the left disparity map, $d_R(x, y)$ represents the disparity value in the right disparity map, and k is a constant value indicative of a position of an observation point between left and right eye; and
    generating, by the processor, the pair of stereoscopic images from the first RGB image, the pair of stereoscopic images comprising a left eye image and a right eye image, wherein the left eye image is generated by shifting a first set of pixels in the first RGB image based on the left disparity map, and the right eye image is generated by shifting a second set of pixels in the first RGB image based on the disparity map.

2. The method of claim 1, further comprising:
    generating, based on the pair of stereoscopic images by the processor, a pair of adjusted display images resized to display requirements of an augmented reality (AR), virtual reality (VR), or mixed reality (MR) device, the pair of adjusted display images comprising a left eye display image derived from the left eye image and a right eye display image derived from the right eye image.

3. The method of claim 1, wherein the first disparity map is a two-dimensional (2D) matrix, wherein each element indicates a disparity value associated with a pixel in the first RGB image.

4. The method of claim 1, wherein the RGB-D image is captured by an RGB-D sensor, and the depth value of a pixel in the depth image indicates a distance between the RGB-D sensor and a corresponding object captured in the first RGB image.

5. The method of claim 1, wherein shifting the first set of pixels in the first RGB image based on the left disparity map is based on:
    $Pixel_L(x, y)=Pixel(x+d_L,y)=(R(x+d_L, y), G(x+d_L, y), B(x+d_L, y))$; and shifting the second set of pixels in the first RGB image based on the right disparity map is based on:
    $Pixel_R(x, y)=Pixel(x+d_R, y)=(R(x+d_R, y), G(x+d_R, y), B(x+d_R, y))$, wherein $Pixel_L(x, y)$ is a pixel $(x, y)$ in the left eye image, $Pixel_R(x, y)$ is a pixel $(x, y)$ in the right eye image, $Pixel(x, y)$ is a pixel $(x, y)$ in the first RGB image, and $(R(x,y), G(x,y), B(x,y))$ is a RGB color for the pixel $(x, y)$.

6. The method of claim 1, wherein determining, based on the depth values in the depth image, the first disparity map in accordance with the RGB-D image comprises: determining the first disparity map based on the focal length f, the interpupillary distance b, and the depth values in the depth image.

7. An apparatus for generating stereoscopic display contents, comprising:
    a non-transitory memory; and
    a processor, wherein the non-transitory memory includes instructions executable by the processor to:
        obtain, from a Red, Green, Blue plus Distance (RGB-D) image, a first Red, Green, and Blue (RGB) image and a depth image;
        determine, based on depth values in the depth image, a first disparity map in accordance with the RGB-D image using at least one of a focal length f or an interpupillary distance b, wherein the first disparity map comprises a plurality of disparity values for the first RGB image to be transformed to a pair of stereoscopic images;
        determine a left disparity map and a right disparity map by transforming the first disparity map using a disparity distribution ratio k, wherein the left disparity map is determined based on $$d_L(x, y) = k * d(x, y) = k * \left(\frac{f * b}{z(x, y)}\right),$$

and the right disparity map is determined based on $$d_R(x, y) = (k-1) * d(x, y) = (k-1) * \left(\frac{f * b}{z(x, y)}\right),$$

wherein z(x,y) is the depth value of a pixel (x,y) in the RGB-D image, d(x, y) is the disparity value in the first disparity map, $d_L(x, y)$ is the disparity value in the left disparity map, $d_R(x, y)$ is the disparity value in the right disparity map, and k is a constant value indicative of a position of an observation point between left and right eye; and generate the pair of stereoscopic images from the first RGB image, the pair of stereoscopic images comprising a left eye image and a right eye image, wherein the left eye image is generated by shifting a first set of pixels in the first RGB image based on the left disparity map, and the right eye image is generated by shifting a second set of pixels in the first RGB image based on the right disparity map.

8. The apparatus of claim 7, wherein the instructions executable by the processor further comprise instructions to:
generate, based on the pair of stereoscopic images, a pair of adjusted display images resized to display requirements of an augmented reality (AR), virtual reality (VR), or mixed reality (MR) device.

9. The apparatus of claim 7, wherein the first disparity map is a two-dimensional (2D) matrix, wherein each element indicates a disparity value.

10. The apparatus of claim 7, wherein the RGB-D image is captured by an RGB-D sensor, the left eye image comprises a second RGB image, and the right eye image comprises a third RGB image.

11. The apparatus of claim 10, where a pixel in the depth image indicates a distance between the RGB-D sensor and a corresponding object captured in the first RGB image.

12. The apparatus of claim 7, wherein shifting the first set of pixels in the first RGB image based on the left disparity map is based on:
Pixel$_L$(x, y)=Pixel(x+d$_L$,y)=(R(x+d$_L$, y), G(x+d$_L$, y), B(x+d$_L$, y)); and shifting the second set of pixels in the first RGB image based on the right disparity map is based on:
Pixel$_R$(x, y)=Pixel(x+d$_R$, y)=(R(x+d$_R$, y), G(x+d$_R$, y), B(x+d$_R$, y)), wherein Pixel$_L$(x, y) is a pixel (x, y) in the left eye image, Pixel$_R$(x, y) is a pixel (x, y) in the right eye image, Pixel(x, y) is a pixel (x, y) in the first RGB image, and (R(x,y), G(x,y), B(x,y)) is a RGB color for the pixel (x, y).

13. A non-transitory computer-readable storage medium configured to store computer programs for generating stereoscopic display contents, the computer programs comprising instructions executable by a processor to:
obtain, from a Red, Green, Blue plus Distance (RGB-D) image, a first Red, Green, and Blue (RGB) image and a depth image;
determine, based on depth values in the depth image, a first disparity map in accordance with the RGB-D image using at least one of a focal length f or an interpupillary distance b, wherein the first disparity map comprises a plurality of disparity values for the first RGB image to be transformed to a pair of stereoscopic images;
determine a left disparity map and a right disparity map by transforming the first disparity map using a disparity distribution ratio k, wherein the left disparity map is determined based on $$d_L(x, y) = k * d(x, y) = k * \left(\frac{f * b}{z(x, y)}\right),$$

and the right disparity map is determined based on $$d_R(x, y) = (k-1) * d(x, y) = (k-1) * \left(\frac{f * b}{z(x, y)}\right),$$

wherein z(x, y) is the depth value of a pixel (x,y) in the RGB-D image, d(x, y) is the disparity value in the first disparity map, $d_L(x, y)$ is the disparity value in the left disparity map, $d_R(x, y)$ is the disparity value in the right disparity map, and k is a constant value indicative of a position of an observation point between left and right eye; and generate, by the processor, the pair of stereoscopic images comprising a left eye image and a right eye image, wherein the left eye image is generated by shifting a first set of pixels in the first RGB image based on the left disparity map, and the right eye image is generated by shifting a second set of pixels in the first RGB image based on the right disparity map.

14. The non-transitory computer-readable storage medium of claim 13, wherein the instructions executable by the processor further comprises instructions to:
generate, based on the pair of stereoscopic images by the processor, a pair of adjusted display images resized to display requirements of an augmented reality (AR), virtual reality (VR), or mixed reality (MR) device.

15. The non-transitory computer-readable storage medium of claim 13, wherein the first disparity map is a two-dimensional (2D) matrix, wherein each element indicates a disparity value.

16. The non-transitory computer-readable storage medium of claim 13, wherein the RGB-D image is captured by an RGB-D sensor.

* * * * *